US006711259B1

(12) United States Patent
Haimi-Cohen et al.

(10) Patent No.: US 6,711,259 B1
(45) Date of Patent: Mar. 23, 2004

(54) METHOD AND APPARATUS FOR NOISE SUPPRESSION AND SIDE-TONE GENERATION

(76) Inventors: Raziel Haimi-Cohen, 2 Layng Ter., Springfield, NJ (US) 07081; Youhong Lu, 395 Sycamore St., Vernon Hills, IL (US) 60061

( * ) Notice: Subject to any disclaimer, the term of this patent is extended or adjusted under 35 U.S.C. 154(b) by 0 days.

(21) Appl. No.: 09/444,638

(22) Filed: Nov. 22, 1999

(51) Int. Cl.[7] ........................... H04M 1/00; H04M 9/00

(52) U.S. Cl. ............ 379/391; 379/392.01; 379/390.03; 455/570

(58) Field of Search ....................... 379/399.01, 392.01, 379/391, 390.03, 390.01, 388.06, 390.02, 392, 395, 398, 399.02, 406.01, 406.06, 406.07, 406.04; 455/570; 370/286, 288, 289, 290

(56) References Cited

U.S. PATENT DOCUMENTS

| | | | | | |
|---|---|---|---|---|---|
| 5,384,843 | A | * | 1/1995 | Masuda et al. | 379/391 |
| 5,495,527 | A | * | 2/1996 | Rollhaus, Jr. et al. | 379/387 |
| 5,553,134 | A | * | 9/1996 | Allen et al. | 379/387 |
| 5,617,472 | A | * | 4/1997 | Yoshida et al. | 379/390 |
| 5,708,722 | A | * | 1/1998 | Forgues et al. | 381/94.1 |
| 6,097,820 | A | * | 8/2000 | Turner | 381/94.1 |
| 6,304,654 | B1 | * | 10/2001 | Wittman | 379/387.01 |
| 6,434,110 | B1 | * | 8/2002 | Hemkumar | 370/201 |

FOREIGN PATENT DOCUMENTS

| | | | |
|---|---|---|---|
| DE | 0584649 A1 | * | 8/1993 |
| DE | WO 00/52917 | * | 9/2000 |
| JP | 6-209362 | * | 6/1994 |
| JP | 10-23138 | * | 10/1998 |
| JP | 363084216 A | * | 2/2002 |

* cited by examiner

*Primary Examiner*—Rexford Barnie

(57) ABSTRACT

An audio processing module, in accordance with the invention, includes an input for receiving input signals. A side tone generator is included for receiving the input signals and for generating a side tone to be output. A noise suppressor is coupled to the input for suppressing noise of the input signal prior to a coding process, the noise suppressor providing feedback to the side tone generator to adjust a gain of the input signal to the output. A method for adjusting the gain of the side tone generator is also included.

23 Claims, 6 Drawing Sheets

100

METHOD AND APPARATUS FOR NOISE SUPPRESSION AND SIDE-TONE GENERATION

BACKGROUND

1. Technical Field

This disclosure relates to audio processing and more particularly, to an improved method and apparatus for noise suppression and side tone generation for telephone handsets.

2. Description of the Related Art

Audio processing modules for telephones, in particular digital telephones include several modules which interact to provide improved processed signals. For example, in a telephone handset, a microphone is provided to receive audio input and a receiver is provided to receive an output signal (ear piece on the handset).

Referring to FIG. 1, a side tone generator 10 multiplies an input signal from a microphone 12 by a fixed gain $g_{st}$, the amplified input signal is added to an output from a buffer 16, which stores signals from a speech decoder 18. Side tone generator 10 outputs to a receiver (ear piece speaker/output) 14 to output a signal to be heard be a user. The input signal from microphone 12, is received in another buffer 20 and output to a speech encoder 22. Thus, when the user talks into microphone 12, the user hears the speech in receiver 14. This is an indication to the user that the handset is "alive". Note that side tone generator 10 works in a sample by sample mode and therefore its delay is minimal. The side tone generator preferably meets two important criteria: 1) Very low delay—otherwise the side tone becomes an annoying echo; and 2) when the user does not talk, background noise should not be allowed to be mixed with the receiver output signal because it degrades the quality of the received (far-end) signal.

A microphone expander 30 is a sub-module which suppresses ambient noise in the microphone input when the user does not speak. It primarily includes two components: 1) a variable attenuator 32 which attenuates the microphone signal; and 2) an attenuation control (gain control) 34 which receives the incoming microphone signal and determines what level of attenuation should be applied. Typically, an attenuation control algorithm attempts to apply no attenuation when the user's speech is present and high attenuation when the user does not speak. Therefore, background noise is attenuated when the user does not speak.

Microphone expander 30 works on a sample by sample basis, thus its delay is negligible. Typically, the microphone signal is processed by microphone expander 30 before it is fed into side tone generator 10. Thus, when the user does not speak, the side tone signal is effectively attenuated and noise does not get mixed with the receiver's signal. However, other noise such as background noise may be introduced to the input signal and may make encoding difficult or may distort the input signal.

Further, voice band modems are used to transmit various types of data over a telephone network, including Baudot signals for teletypes (TTY), fax, and various other data signals. In a cellular network, the transmission of such signals is often distorted and therefore those signals may need to be decoded and transmitted as data using special service options. If the modem is in an external device which is connected to the terminal via an audio port then the terminal needs to "know" that the signal is in fact a modem signal and should be treated accordingly. This may be done by asking the user to key in a special code to or by providing some identification mechanism in the connection between the external device and the handset. However, these methods are cumbersome, particularly if switching between modem and voice signals is allowed during the conversation.

Therefore, a need exists for an audio processing module/stage which provides uniform noise suppression and side tone generation to all calls on a telephone. A further need exists for a method of utilizing a noise suppression module to detect the presence of modem signals in an input.

SUMMARY OF THE INVENTION

An audio processing module, in accordance with the invention, includes an input for receiving input signals. A side tone generator is included for receiving the input signals and for generating a side tone to be output. A noise suppressor is coupled to the input for suppressing noise of the input signal, the noise suppressor providing feedback to the side tone generator to adjust a gain of the input signal to the output.

An audio processing module for telephone handsets includes a microphone input for receiving input signals. A side tone generator receives the input signals and generates a side tone to be output to a speaker, the side tone generator including an attenuator coupled to the microphone for receiving the input signals. A noise suppressor is coupled to the input for suppressing noise of the input signal prior to encoding, the noise suppressor providing feedback to the side tone generator to adjust a gain of the attenuator by multiplying the input signal according to the feedback of the noise suppressor.

In alternate embodiments, one of a speech encoder and a modem decoder may be coupled to the noise suppressor for processing the input signal. The side tone generator may include sample by sample processing and the noise suppressor includes block processing. A buffer may provide delay between the noise suppressor and the side tone generator. The noise suppressor preferably includes Enhanced Variable Rate Codec noise suppression (TIA/EIA/IS-127, Enhanced Variable Rate Codec, Speech Service Option 3 for Wide Band Spread Spectrum Digital Systems, sec. 4.1.2, Sep. 9, 1996). The side tone generator may include a variable gain attenuator for adjusting the gain of the input signal. The feedback may adjust the gain according to an estimate of signal to noise ratio of the input signal. The feedback adjusts the gain according to a calculated gain based on the input signal. The noise suppressor may include a microphone expander for adjustably attenuating a noise suppressed signal output from the noise suppressor. A speech encoder may be coupled to the noise suppressor for encoding the input signal.

A method for suppressing noise and adjusting side tone for a telephone hand set includes the steps of providing an audio processing module including an input for receiving input signals, a side tone generator for receiving the input signals and for generating a side tone to be output and a noise suppressor coupled to the input for suppressing noise of the input signal prior to a coding process, the noise suppressor providing feedback to the side tone generator to adjust a gain of the input signal to the output, determining an instantaneous gain for adjusting the side tone generator based on characteristics of the input signal and adjusting the gain of the side tone generator according to the instantaneous gain.

In other methods, the step of determining the instantaneous gain may include the steps of estimating signal to noise ratios (SNRs) for frequency channels of the input, computing a representative SNR based on all channel SNRs and determining the instantaneous gain based on the representative SNR. The representative SNR may be one of an average SNR of all the channels and a maximum SNR of all the channels. The method further may includes the step of converting the SNR to a gain in decibels by a linear transformation. The instantaneous gain may be employed as the gain of the side tone generator. The step of determining the instantaneous gain may include the steps of computing noise suppressor gains for channels of the input and determining the instantaneous gain based on the noise suppressor gains. The instantaneous gain may be one of an average of the noise suppressor gains of all the channels and a maximum noise suppressor gain of all the channels.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

Figure 1:
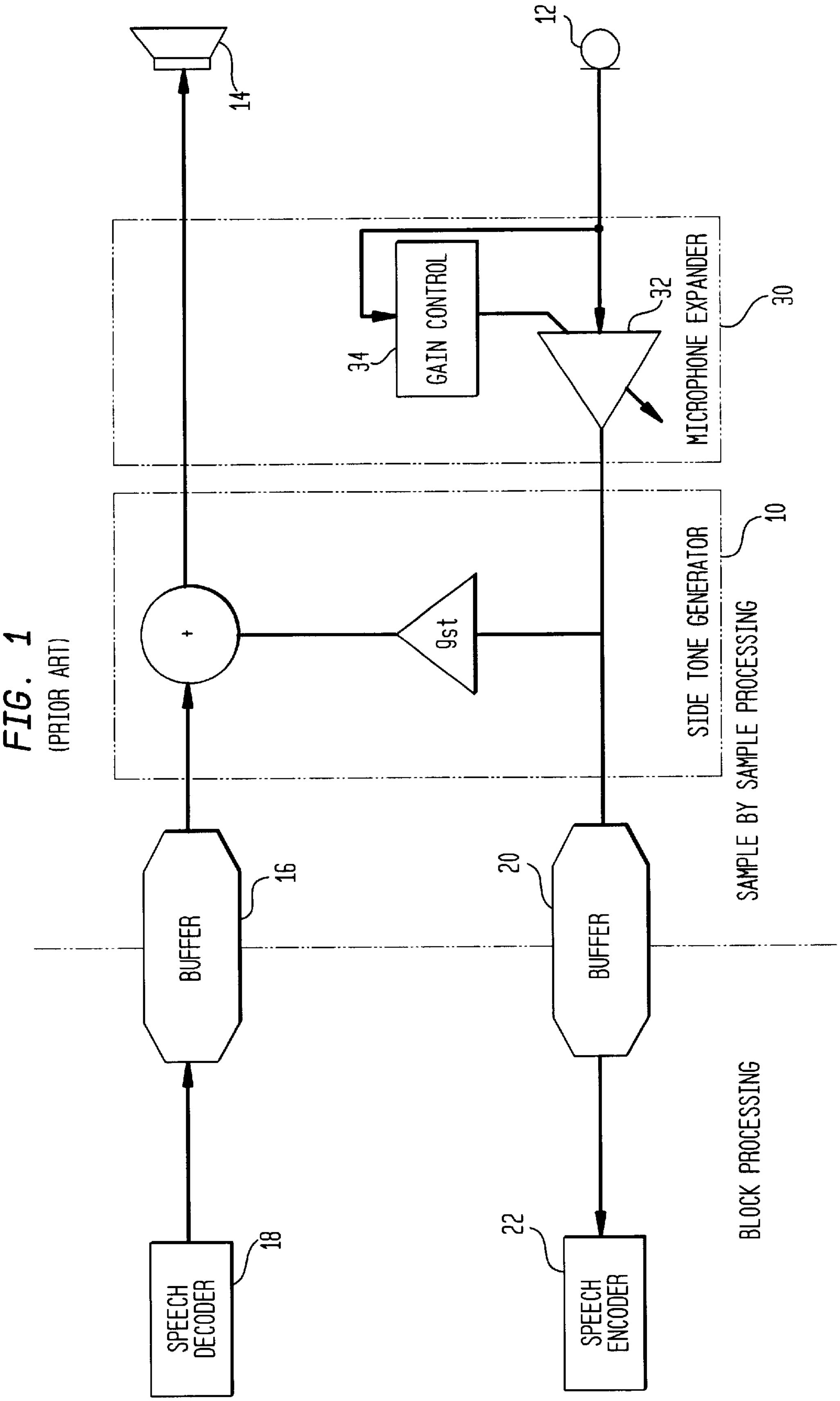
FIG. 1 is a block diagram of an audio processing module for a telephone handset showing a microphone expander in accordance with the prior art.

This disclosure relates to audio processing and more particularly, to an improved method and apparatus for noise suppression and side tone generation for telephone handsets. An audio processing stage for telephone handsets, and in particular for a digital phone, includes several modules which interact with each other. A new audio processing module is added, namely a noise suppressor, in accordance with the present invention. The noise suppressor may be a part of a EVRC (Enhanced Variable Rate Codec from TIA/EIA/IS-127, Speech Service Option 3 for Wide Band Spread Spectrum Digital Systems, sec. 4.1.2, Sep. 9, 1996) vocoder noise suppression module, however, its function is audio processing and not related to any particular coder. Other modules for performing noise suppression may also be included. Interactions among the noise suppressor, a side tone generator and a microphone expander may cause adverse effects in conventional systems, however. These possible adverse effects are reduced or eliminated by the present invention.

The present invention will be described by way of example for the Enhanced Variable Rate Codec (EVRC), however, other vocoders, employing CDMA, TDMA, etc. may be used. Code division multiplexing access (CDMA) terminals support other vocoders in addition to EVRC. The selection of the vocoder to be used is done during the setting up of a call. The vocoder which is used may also be switched during the call as a result of a hard hand-off. The Enhanced Variable Rate Codec (EVRC) standard specifies an optional noise suppressor module as a part of the encoder (TIA/EIA/IS-127, Enhanced Variable Rate Codec, Speech Service Option 3 for Wide Band Spread Spectrum Digital Systems, sec. 4.1.2, Sep. 9, 1996). A high level block diagram of the EVRC noise suppression module is given in FIG. 2. Other noise suppression algorithms and modules may be used and may differ in details, but use similar concepts as described herein.

A noise suppressor will be described generally with reference to FIG. 2. Referring now in specific detail to the drawings in which like reference numerals identify similar or identical elements throughout the several views, and initially to FIG. 2, an input to a noise suppression module 100 is decomposed into narrow band frequency components and down-sampled in block 102. Each component G(k) (k is the frequency index) is multiplied by a gain H(k) from a channel gain calculation block 108, and then the frequency components are up-sampled and combined together in block 104 to form an output signal S(n). In the case of EVRC noise suppression, the frequency analysis and synthesis are done using overlap-add FFT (fast fourier transform), but other methods are also possible. However, regardless of the particular method used, this operation involves a significant delay and in general is much more suitable for block type operation than for sample by sample processing.

The frequency components are grouped into $N_c$ channels, where each channel includes several adjacent frequency components. The same gain H(k) will be applied to all frequency components in the same channel. The channel energy is computed in block 110 for each channel i, its $0iN_c$, and using prior estimates of the background noise from block 112, the channel specific signal to noise ratio (SNR) is computed by the channel SNR estimator 114. This SNR, after some modifications performed in block 116, is used to set the gain H(k). For high SNR, the gain is close to one, while for low SNR, the gain includes a significant attenuation.

The channel SNRs, along with some other parameters, are fed into the noise updated decision in block 118, which decides whether the input block includes all noise or there is some speech present in the frame based on a voice metric calculation 120 and a spectral deviation estimator 122. If there is no speech present, the current channel energies will be used to update the current estimated background noise.

One important aspect underlying the algorithm is that noise is independent of the user's speech and that the noise changes slowly, thus noise level of each channel during speech is essentially the same as the corresponding noise levels during the last no-speech interval. Although noise suppression module 100 described above is a part of the EVRC standard, it is in fact a separate module which precedes speech encoder 22 of FIG. 2 (also see FIG. 3). It may be used to clean speech at the input of any speech encoder and on the other hand, other similar noise suppression schemes may also be used.

If the input speech signal is processed by microphone-expander 30 (FIG. 1) before being processed by noise suppression module 100, the underlying assumptions of noise suppression, namely, that noise is independent of the user's speech and that the noise changes slowly, are violated. That is, the background noise becomes statistically dependent on the speech because the background noise is attenuated whenever no speech is present. Consequently, a microphone-expander before the noise suppression may render the noise suppression module useless. Hence, the microphone-expander may be either eliminated or placed after the noise suppression module in the processing order (see FIG. 4). However, the delay and block processing nature of the noise suppression make it less desirable to put it before the side tone. Therefore; adding the noise suppression module in appropriate way may leave no noise-handling module before the side tone generator, thus background noise could be picked up by the microphone and added to the loudspeaker output.

Figure 3:
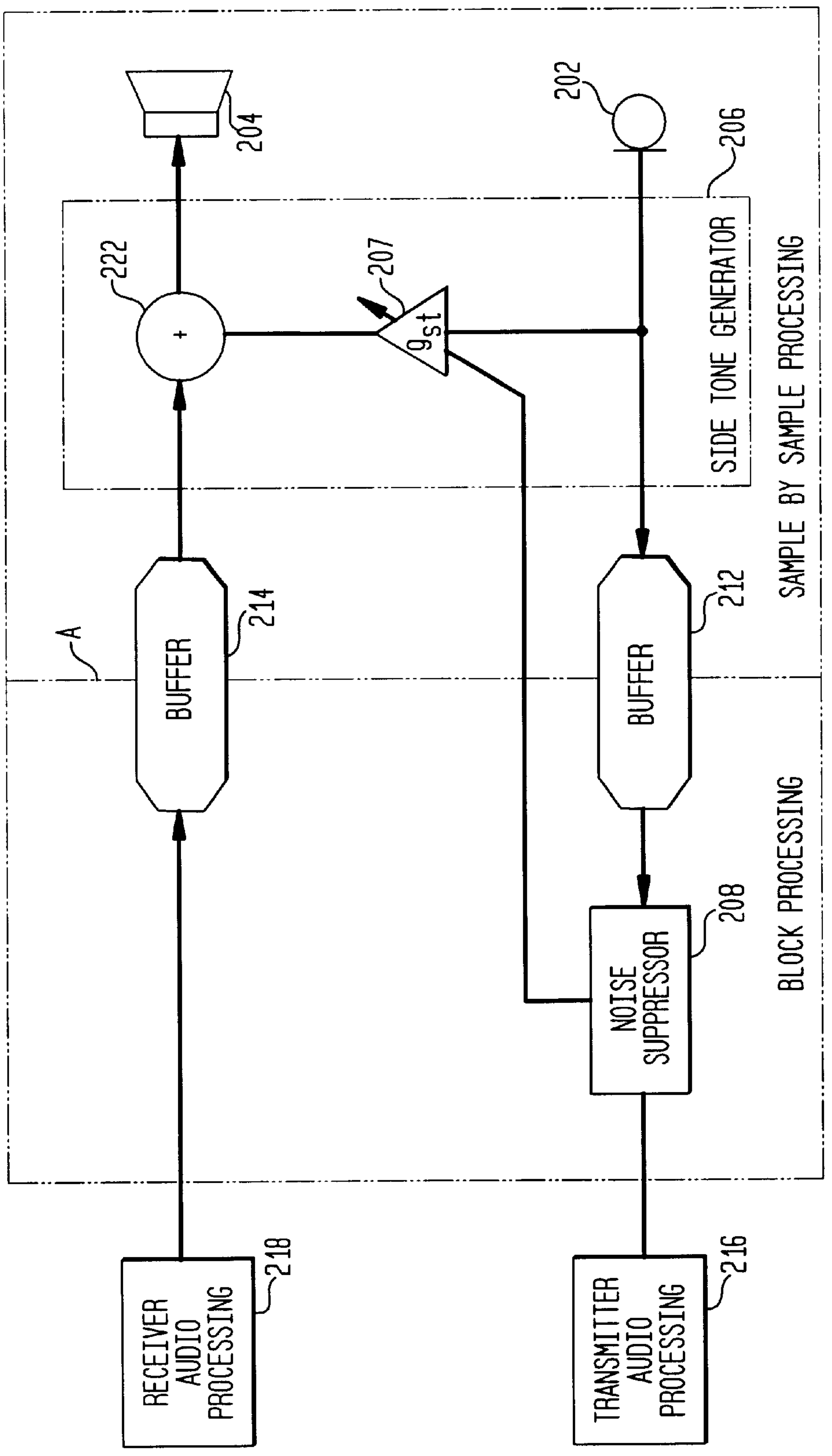
FIG. 3 is a block diagram of an audio processing module/stage including a noise suppression module and a variable attenuator controlled by feedback from the noise suppression module in accordance with the present invention.

Referring to FIG. 3, a block diagram for an audio processing module/stage 200 is shown and referred to generally as module 200. Module 200 includes a microphone (mouth piece) 202, a receiver or output (ear piece) 204. It is to be understood that the present embodiment does not include a microphone expander (30 of FIG. 1). A side tone generator 206 is included. The noise in the side tone is removed when the user is not speaking by making a side tone gain, $g_{st}$ adjustable, and lowering the side tone gain $g_{st}$ when the user is not speaking. Side tone gain $g_{st}$ is preferably provided by a variable gain attenuator 207. The setting of the gain is done by a noise suppressor 208 in accordance with the invention.

An audio processing transmitter 216 is included for transmitting the noise suppressed input for processing. Transmitter 216 preferably includes a speech encoder or a plurality of speech encoders for digital cellular applications, transmitter 216 may be employed in analog cellular and wired telephone applications as well. Speech encoder of transmitter 216 is included for encoding speech input from microphone 202 through side tone generator 206 during a call. A buffer 212 stores incoming signals temporarily and then outputs them to noise suppressor 208. Since processing is preferably sample by sample on the right of line "A" and preferably block by block processing to the left of line "A", buffers 212 and 214 provide a delay for converting the processing systems. Buffer 212 outputs to noise suppressor 208 which in turn outputs the input from microphone 202 to speech encoder of transmitter 216. Speech encoder of transmitter 216 encodes the input speech for processing to be transmitted over a network, for example a cellular network. Likewise, an audio processing receiver 218 preferably includes a speech decoder which decodes speech/data received from the network. Receiver 218 may include a plurality of speech decoders for digital cellular applications, receiver 218 may be employed in analog cellular and wired telephone applications as well. When a decoder is included in receiver 218, the decoded signals are input to buffer 214 and delayed to be input to side tone generator 206. Side tone generator 206 includes an adder 222 for adding the input signal multiplied by $g_{st}$ and a decoded signal from buffer 214.

Figure 4:
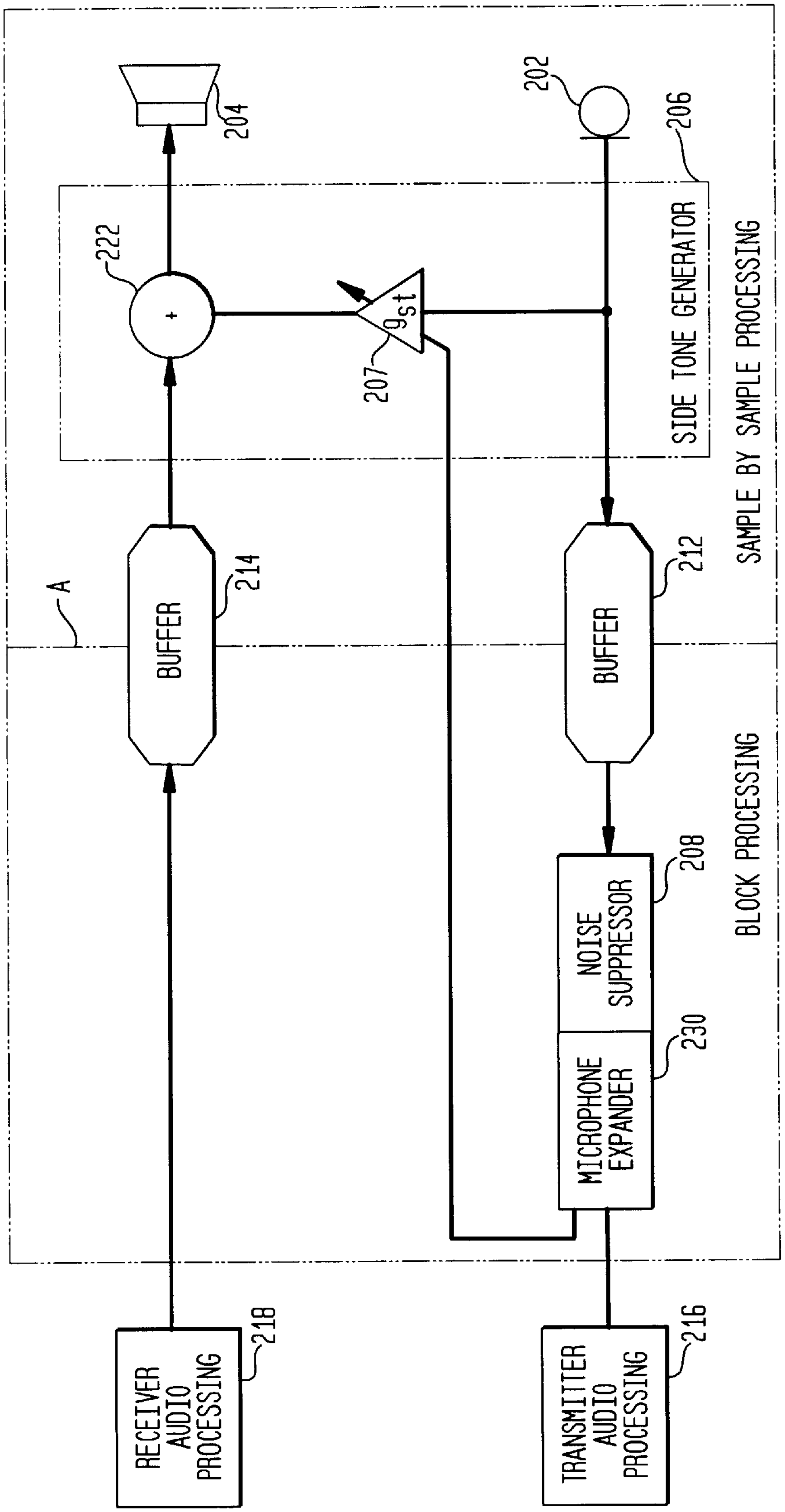
FIG. 4 is a block diagram of an audio processing module/stage including a noise suppression module and a variable attenuator controlled by feedback from the noise suppressor and a microphone expander added as an additional variable attenuator in accordance with the present invention.

Noise suppressor 208 includes the functions of the eliminated microphone expander (30). In one embodiment, as shown in FIG. 4, a microphone expander 230 is included in noise suppressor 208 and functions as an additional variable attenuator. In this way, noise is attenuated, as described above with reference to FIG. 1, prior to being input to transmitter 216.

Referring again to FIG. 3, a delay may be caused by noise suppressor 208 and buffer 212, however, the gain itself is applied instantaneously. In one embodiment, there is a delay of about 23 msec in the setting of the gain, caused by noise suppressor 208 and buffer 212. There will be no delay between the user's speech and the side tone, as a result, at the beginning of the speech segment for the first about 20–40 msec, the side-tone signal may be attenuated and for about 20–40 msec after the end of the speech segment the background noise may be heard. However, these intervals of 20–40 msec are too short to be noticeable by the user. Note that the actual block size of noise suppressor 208 is preferably about 80 samples. Therefore, the delay the system may be made as low as 13 msec (down from about 23 msec) if noise suppressor 208 is called every 80 samples.

Adjustment of the side-tone gain $g_{st}$ may be performed in several ways. Among the ways to adjust side tone gain $g_{st}$, two are described, but many other methods may be used.

Figure 2:
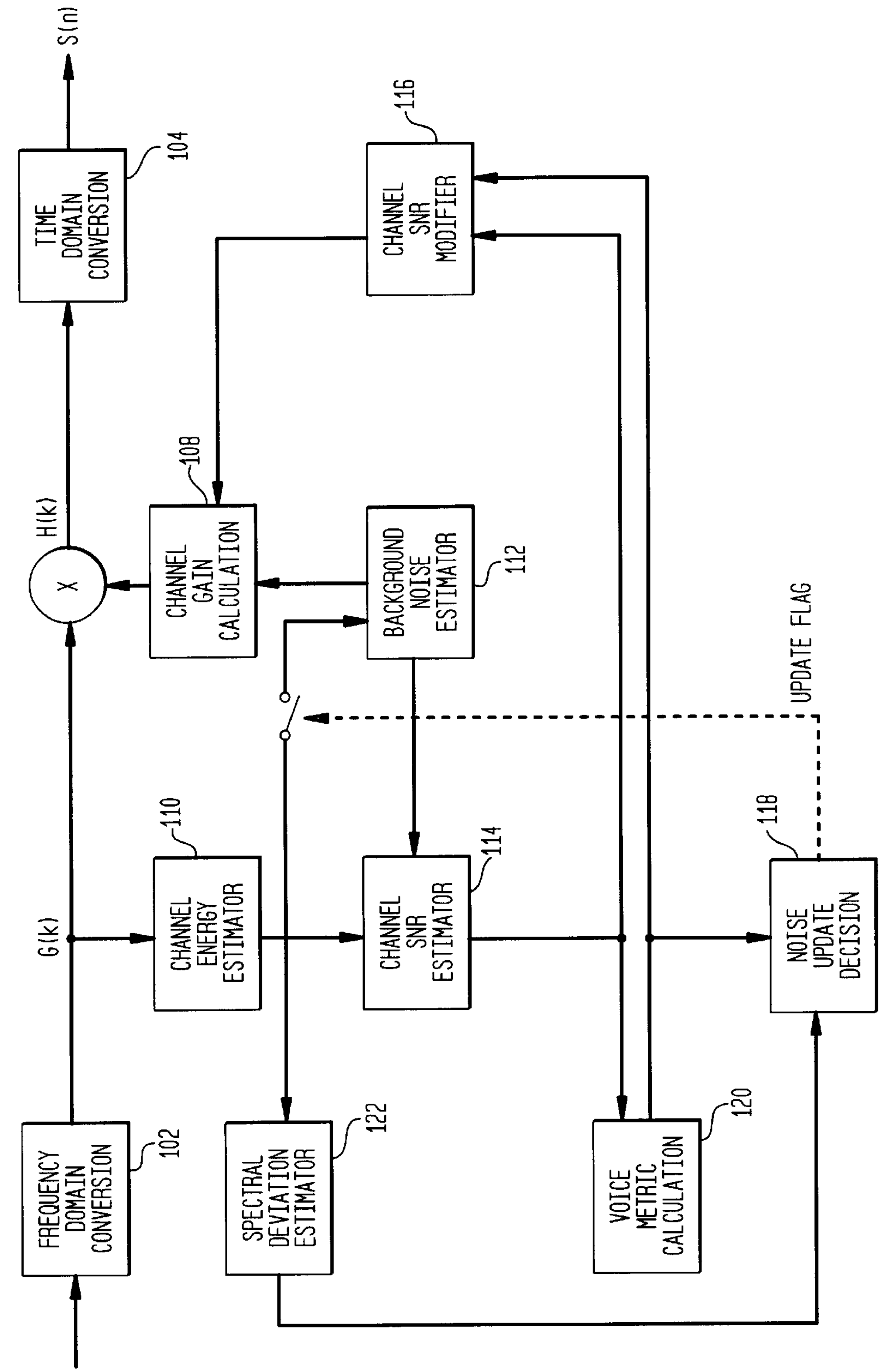
FIG. 2 is a block diagram of noise suppression module which may be employed in accordance with the present invention.
Figure 5:
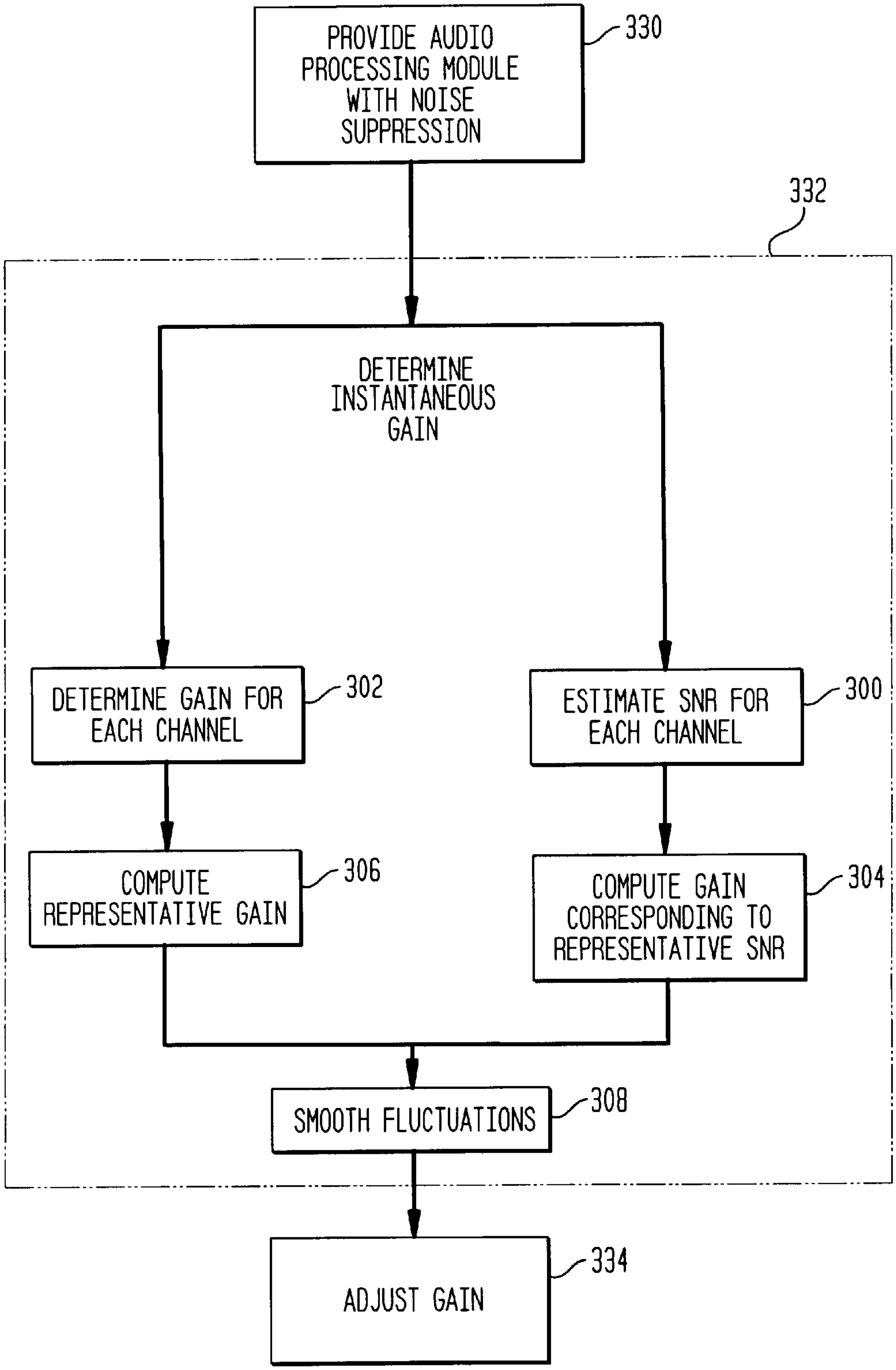
FIG. 5 is a flow diagram of a method of adjusting a variable attenuator in accordance with the present invention.

Referring to FIG. 2 and FIG. 5, one method for adjusting $g_{st}$ is included using a representative signal to noise ratio (SNR). In this method, noise suppressor 208 may include an EVRC noise suppression module as described with reference to FIG. 2. Noise suppressor 208 is provided in block 330. An instantaneous gain is determined in block 332 and the instantaneous gain is used to adjust the gain of attenuator 207 (FIG. 3) in block 334. Block 332 may include the following steps. Noise suppressor 208 estimates the signal to noise ratio SNR(i) for each channel $0 \leqq i \leqq N_c$ in block 300. This is preferably performed in block 114 and 116 of FIG. 2. A representative SNR may be computed from the set of all channels SNRs as their average or maximum. An instantaneous gain may be computed from the representative SNR using some increasing non-linear function which will give higher gain for higher representative SNR in block 304. For example, a linear transformation may be used to convert the representative SNR into the gain in dB and the result may be clipped from above to and below the minimal and maximal stantaneous gain.

The instantaneous gain may be used directly as the side tone gain. Alternatively, it may be smoothed in the time domain by appropriate filtering in order to prevent random fluctuations in the side tone level in block 308. Hysteresis may also be applied in order to improve the response during week speech sounds.

Referring again to FIG. 5, another method of side tone gain adjustment is described using a representative noise suppressor gain. Noise suppressor 208 computes a gain for each frequency channel $0 \leqq i \leqq N_c$ in block 302. A value of gain is preferably employed from block 108 of FIG. 2. A representative gain or instantaneous gain may be computed from the set of channel gains, for example, as their average or their maximum in block 306. This representative gain may be used as the side tone gain.

Although noise suppressor 208 is defined as a part of the EVRC standard, it is a stand alone module with clearly defined input and output. Therefore, it may be used as a separate processing stage, in the method described above, before feeding the speech signal to any of the vocoders (i.e., speech encoder 216). Similarly, noise suppressor 208 may be applied to analog cellular telephony, such as Advanced Mobile Phone Service (AMPS) processing in AMPS mode. Thus, noise suppressor may be used for all vocoders and for AMPS.

Noise suppressor 208 has many advantages. Two important advantages include: 1) the noise suppressor provides better and more uniform speech quality; and 2) the noise suppressor eliminates the need to include the microphone expander in the system, since the noise suppressor will control the side tone gain in all modes of operation in accordance with the present invention.

Figure 6:
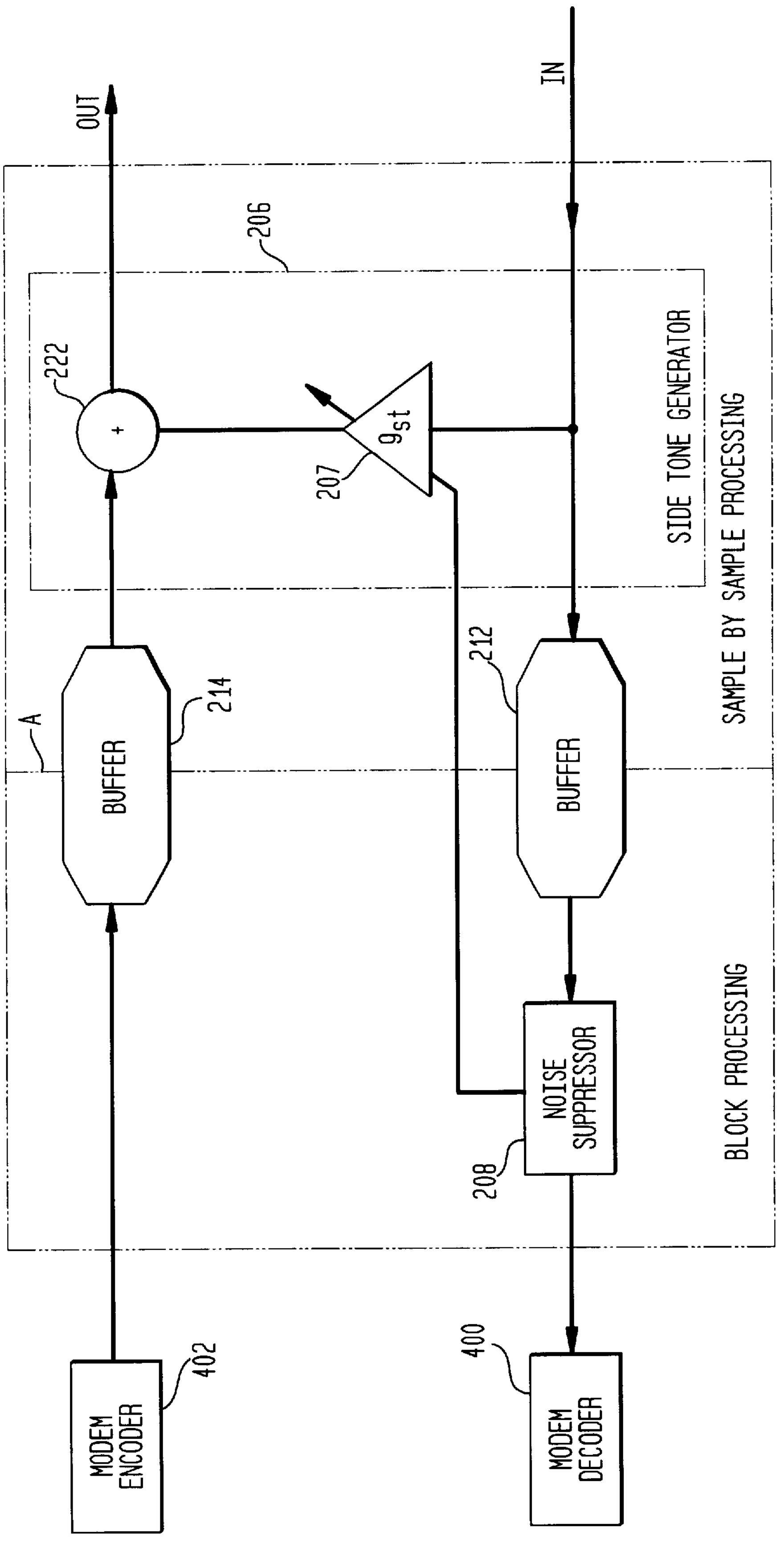
FIG. 6 is a block diagram of an audio processing module/stage including a noise suppression module and a variable attenuator controlled by feedback from the noise suppression module for use with modems in accordance with the present invention.

Referring to FIG. 6, noise suppressor 208 may be used to detect modem signals. Many modem signals, e.g. Baudot signals used for TTYs, use few, clearly distinct frequencies to encode the signal. By computing the signal energy in individual frequency components, the system in accordance with the invention can easily check if most of the signal energy is concentrated in those specific frequencies. If this is the case, an appropriate data modem decoder 400 may be applied instead of the speech decoder, or other appropriate action may take place, such as including a modem encoder 402.

In preferred embodiments of the present, noise suppression is introduced into a cellular phone. The microphone expander may be eliminated or merged into the noise suppressor as an additional variable attenuation. The noise suppressor may be modified to control the side tone gain. The control may be such that when the user speaks, the side tone gain reaches a maximal nominal value. When the user does not speak the side tone gain is reduced to prevent background noise from Go am corrupting the far end speech. The control of the side tone gain may be based on the per-channel gains or per-channel estimated SNRs computed inside the noise suppressor. The noise suppressor is not placed as a sub-module of a particular vocoder, but as a module in the audio front end, so uniform noise rejection performance is obtained in all vocoders and also in AMPS. The spectral decomposition performed inside the noise suppressor may be used to detect modem signals from an external device, such as TTY signals, and invoke the appropriate action to handle such signals.

Having described preferred embodiments for a novel method and apparatus for noise suppression and side tone generation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An audio processing apparatus comprising:

an input for receiving input signals;

a side tone generator for receiving the input signals and for generating a side tone to be output; and a noise suppressor coupled to the input for suppressing noise of the input signal, the noise suppressor providing feedback to a gain control input of the side tone generator to adjust a side tone gain of the side tone generator.

2. The audio processing apparatus as recited in claim 1, further comprising one of a speech encoder and a modem decoder coupled to the noise suppressor for processing the input signal.

3. The audio processing apparatus as recited in claim 1, wherein the side tone generator includes sample by sample processing and the noise suppressor includes block processing.

4. The audio processing apparatus as recited in claim 1, further comprising a buffer for providing delay between the noise suppressor and the side tone generator.

5. The audio processing apparatus as recited in claim 1, wherein the noise suppressor includes an Enhanced Variable Rate Codec noise suppression module.

6. The audio processing apparatus as recited in claim 1, wherein the side tone generator includes a variable gain attenuator for adjusting the side tone gain.

7. The audio processing apparatus as recited in claim 1, wherein the feedback adjusts the side tone gain according to an estimate of signal to noise ratio of the input signal.

8. The audio processing apparatus as recited in claim 1, wherein the feedback adjusts the side tone gain according to a gain calculated by the noise suppressor.

9. An audio processing apparatus for telephone handsets comprising:

a microphone input for receiving input signals;

a side tone generator for receiving the input signals and for generating a side tone to be output to a speaker, the side tone generator including an adjustable gain element coupled to the microphone for receiving the input signals; and a noise suppressor coupled to the input for suppressing noise of the input signal prior to encoding, the noise suppressor providing feedback to a gain control input of the side tone generator to adjust a side tone gain of the side tone generator by multiplying the input signal according to the feedback of the noise suppressor.

10. The audio processing apparatus as recited in claim 9, wherein the noise suppressor includes a microphone expander for adjustably attenuating a noise suppressed signal output from the noise suppressor.

11. The audio processing apparatus as recited in claim 9, further comprising a speech encoder coupled to the noise suppressor for encoding the input signal.

12. The audio processing apparatus as recited in claim 9, wherein the side tone generator includes sample by sample processing and the noise suppressor includes block processing.

13. The audio processing apparatus as recited in claim 9, further comprising a buffer for providing delay between the noise suppressor and the side tone generator.

14. The audio processing apparatus as recited in claim 9, wherein the noise suppressor includes a vocoder for audio processing.

15. The audio processing apparatus as recited in claim 14, wherein the vocoder includes Enhanced Variable Rate Codec noise suppression.

16. A method for suppressing noise and adjusting side tone for a telephone hand set comprising the steps of:

providing an audio processing apparatus including an input for receiving input signals, a side tone generator for receiving the input signals and for generating a side tone to be output and a noise suppressor coupled to the input for suppressing noise of the input signal, the noise suppressor providing feedback to a gain control input of the side tone generator to adjust a side tone gain of the side tone generator;

determining an instantaneous gain for adjusting the side tone gain of the side tone generator based on characteristics of the input signal; and adjusting the side tone gain of the side tone generator according to the instantaneous gain.

17. The method as recited in claim 16, wherein the step of determining the instantaneous gain includes the steps of:

estimating signal to noise ratios (SNRs) for frequency channels of the input;

computing a representative SNR based on all channel SNRs; and determining the instantaneous gain based on the representative SNR.

18. The method as recited in claim 17, wherein the representative SNR is one of an average SNR of all the channels and a maximum SNR of all the channels.

19. The method as recited in claim 17, further comprising the step of converting the SNR to a gain in decibels by a linear transformation.

20. The method as recited in claim 16, wherein the instantaneous gain is employed as the side tone gain of the side tone generator.

21. The method as recited in claim 16, wherein the step of determining the instantaneous gain includes the steps of:

computing noise suppressor gains for channels of the input; and determining the instantaneous gain based on the noise suppressor gains.

22. The method as recited in claim 21, wherein the instantaneous gain is one of an average of the noise suppressor gains of all the channels and a maximum noise suppressor gain of all the channels.

23. The audio processing apparatus as recited in claim 9, wherein the adjustable gain element comprises an attenuator.

* * * * *

UNITED STATES PATENT AND TRADEMARK OFFICE

CERTIFICATE OF CORRECTION

PATENT NO. : 6,711,259 B1
DATED : March 23, 2004
INVENTOR(S) : R. Haimi-Cohen et al.

It is certified that error appears in the above-identified patent and that said Letters Patent is hereby corrected as shown below:

Title page,
Item [73], Assignee, add the following Assignee:

-- Lucent Technologies Inc., Murray Hill, NJ --

Signed and Sealed this

Fifteenth Day of June, 2004

JON W. DUDAS
*Acting Director of the United States Patent and Trademark Office*